United States Patent
Le Groux et al.

(10) Patent No.: US 12,217,741 B2
(45) Date of Patent: Feb. 4, 2025

(54) LARGE SCALE PRIVACY-PRESERVING SPEECH RECOGNITION SYSTEM USING FEDERATED LEARNING

(71) Applicant: Cisco Technology, Inc., San Jose, CA (US)

(72) Inventors: Sylvain Le Groux, Placerville, CA (US); Erwan Barry Tarik Zerhouni, Zürich (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 561 days.

(21) Appl. No.: 17/324,535

(22) Filed: May 19, 2021

(65) Prior Publication Data

US 2022/0383857 A1 Dec. 1, 2022

(51) Int. Cl.
G10L 15/16 (2006.01)
G06N 3/088 (2023.01)
G10L 15/14 (2006.01)
G10L 25/51 (2013.01)

(52) U.S. Cl.
CPC .............. G10L 15/16 (2013.01); G06N 3/088 (2013.01); G10L 15/142 (2013.01); G10L 25/51 (2013.01)

(58) Field of Classification Search
CPC ....... G10L 15/16; G10L 15/142; G10L 25/51; G06N 3/088
See application file for complete search history.

(56) References Cited

U.S. PATENT DOCUMENTS

| | | | |
|---|---|---|---|
| 9,098,560 B2* | 8/2015 | Fitterer | G06F 16/2433 |
| 10,176,802 B1 | 1/2019 | Ladhak et al. | |
| 2018/0039883 A1 | 2/2018 | Kurata | |
| 2018/0240456 A1* | 8/2018 | Jeong | G10L 15/22 |

(Continued)

OTHER PUBLICATIONS

Ji et al., "Learning Private Neural Language Modeling with Attentive Aggregation," arXiv:1812.07108v2 [cs.CL], Mar. 13, 2019, available at https://doi.org/10.48550/arXiv.1812.07108 (Year: 2019).*

(Continued)

Primary Examiner — Paras D Shah
(74) Attorney, Agent, or Firm — Edell, Shapiro & Finnan, LLC

(57) ABSTRACT

A method for implementing a privacy-preserving automatic speech recognition system using federated learning. The method includes receiving, from respective client devices, at a cloud server, local acoustic model weights for a neural network-based acoustic model of a local automatic speech recognition system running on the respective client devices, wherein the local acoustic model weights are generated at the respective client devices without labelled data, updating a global automatic speech recognition system based on (a) the local acoustic model weights received from the respective client devices and (b) global acoustic model weights of the global automatic speech recognition system derived from labelled data to obtain an updated global automatic speech recognition system, and sending the updated global automatic speech recognition system to the respective client devices to operate as a new local automatic speech recognition system.

20 Claims, 6 Drawing Sheets

(56) References Cited

U.S. PATENT DOCUMENTS

2019/0371298 A1    12/2019  Hannun et al.
2022/0201021 A1*   6/2022   Joshi ................... H04L 63/1425

OTHER PUBLICATIONS

Cui et al., "Federated Acoustic Modeling for Automatic Speech Recognition," IEEE, May 13, 2021, pp. 6748-6752, doi: 10.1109/ICASSP39728.2021.9414305 (Year: 2021).*

Wahab et al., "Federated Machine Learning: Survey, Multi-Level Classification, Desirable Criteria and Future Directions in Communication and Networking Systems," in IEEE Communications Surveys & Tutorials, vol. 23, No. 2, pp. 1342-1397, Feb. 10, 2021, doi: 10.1109/COMST.2021.3058573 (Year: 2021).*

Wang et al., "Addressing Class Imbalance in Federated Learning," Association for the Advancement of Artificial Intelligence, arXiv:2008.06217v2 [cs.LG], Dec. 15, 2020, available at https://doi.org/10.48550/arXiv.2008.06217 (Year: 2020).*

Jiang, Di, et al. "A GDPR-compliant Ecosystem for Speech Recognition with Transfer, Federated, and Evolutionary Learning." ACM Transactions on Intelligent Systems and Technology (2021).*

H. Brendan McMahan et al., "Communication-Efficient Learning of Deep Networks from Decentralized Data", Artificial Intelligence and Statistics, PMLR, Apr. 10, 2017, 10 pages.

Daniel Povey et al., "Parallel Training of Dnns With Natural Gradient and Parameter Averaging", ICLR, arXiv:1410.7455v8 [cs.NE], Jun. 22, 2015, 28 pages.

Dhruv Guliani et al., "Training Speech Recognition Models With Federated Learning: A Quality/Cost Framework", ICASSP 2021-2021 IEEE International Conference on Acoustics, Speech and Signal Processing (ICASSP), Jun. 6, 2021, 5 pages.

Vimal Manohar et al., "Semi-Supervised Training of Acoustic Models Using Lattice-Free MMI", 2018 IEEE International Conference on Acoustics, Speech and Signal Processing (ICASSP), Apr. 15, 2018, 5 pages.

Sheng Li et al. "Semi-Supervised Ensemble DNN Acoustic Model Training", 2017 IEEE International Conference on Acoustics, Speech and Signal Processing (ICASSP), Mar. 5, 2017, 5 pages.

Xiaodong Cui et al., "Federated Acoustic Modeling for Automatic Speech Recognition", ICASSP 2021-2021 IEEE International Conference on Acoustics, Speech and Signal Processing (ICASSP), Jun. 6, 2021, 5 pages.

* cited by examiner

LARGE SCALE PRIVACY-PRESERVING SPEECH RECOGNITION SYSTEM USING FEDERATED LEARNING

TECHNICAL FIELD

The present disclosure relates to a speech recognition system that is configured to preserve privacy of individual users.

BACKGROUND

An Automatic Speech Recognition (ASR) system relies upon substantial amounts of labelled audio training data to be competitive. However, obtaining such a large amount of data is difficult. For example, collecting and sharing audio data and their corresponding transcripts raises privacy concerns for users. Indeed, data privacy laws may very well require that client data stay on-premises. Moreover, human-labelled data is error prone, time consuming, and very costly both in terms of labor and computation.

DESCRIPTION OF EXAMPLE EMBODIMENTS

Overview

Figure 1:
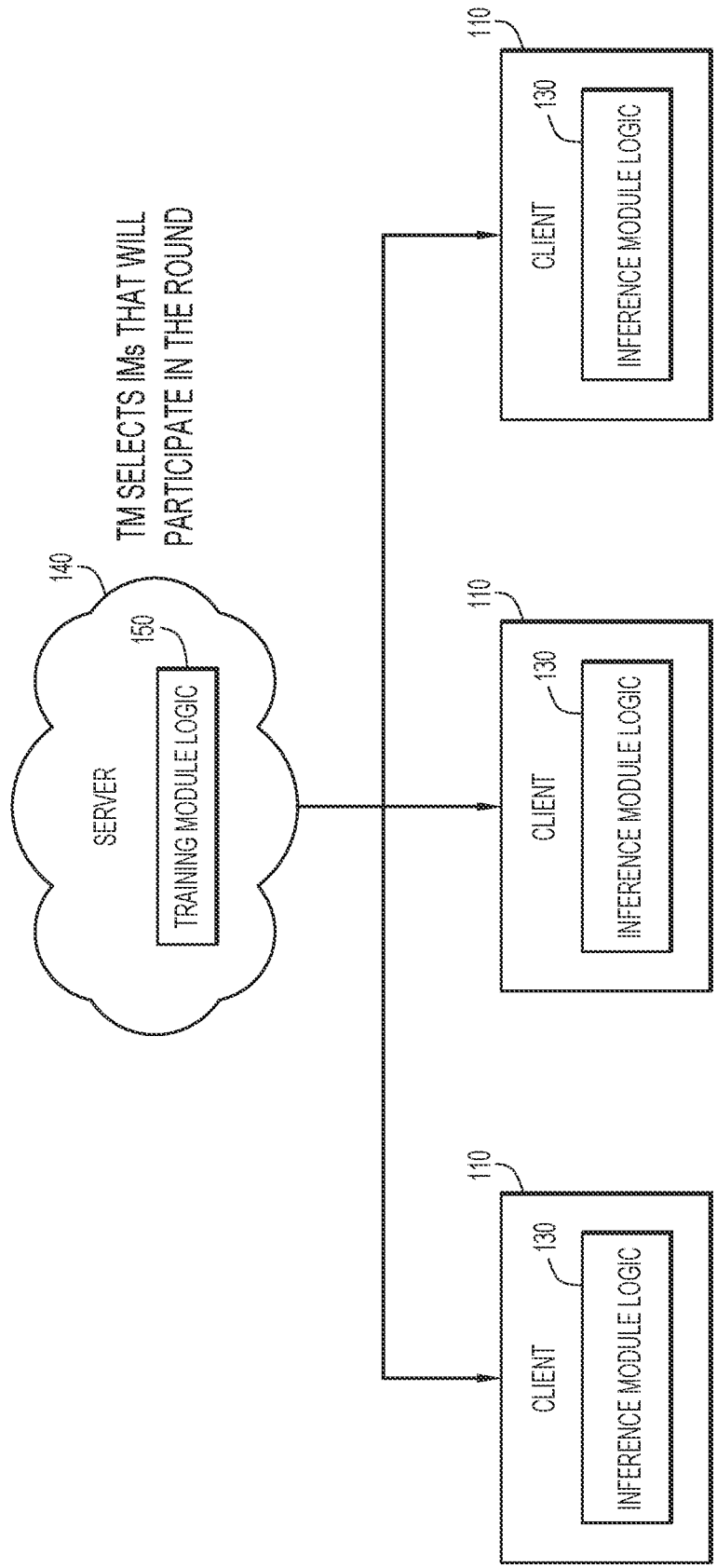
FIGS. 1-4 show the interaction between on-premises inference module (IM) logic and cloud-based training module (TM) logic in a semi-supervised federated learning approach for an ASR system, according to an example embodiment.

Presented herein is a method for implementing a privacy-preserving automatic speech recognition system using federated learning. The method includes receiving, from respective client devices, local acoustic model weights for a neural network-based acoustic model of a local automatic speech recognition system running on the respective client devices, wherein the local acoustic model weights are generated at the respective client devices without labelled data, updating a global automatic speech recognition system based on (a) the acoustic model weights received from the respective client devices and (b) global acoustic model weights of the global automatic speech recognition system derived from labelled data to obtain an updated global automatic speech recognition system, and sending the updated global automatic speech recognition system to the respective client devices to operate as a new local automatic speech recognition system.

In another embodiment, a device is provided. The device includes an interface configured to enable network communications, a memory, and one or more processors coupled to the interface unit and the memory, and configured to: receive, from respective client devices, local acoustic model weights for a neural network-based acoustic model of a local automatic speech recognition system running on the respective client devices, wherein the local acoustic model weights are generated at the respective client devices without labelled data, update a global automatic speech recognition system based on (a) the acoustic model weights received from the respective client devices and (b) global acoustic model weights of the global automatic speech recognition system derived from labelled data to obtain an updated global automatic speech recognition system, and send the updated global automatic speech recognition system to the respective client devices to operate as a new local automatic speech recognition system.

Example Embodiments

While the field of speech recognition has made impressive progress in the past few years notably with the development of powerful deep learning algorithms, several issues remain to be addressed in production systems. The most pressing ones are related to recording environments' diversity (e.g., background noise, close & far field recordings, room acoustics, etc.) and speaker variability (e.g., gender, accents, etc.), as well as privacy concerns given the ubiquity of sound recording devices and the popular centralized architectures deployed to collect, process and train ASR models on such sensitive data.

While signal processing frontends may be configured to mitigate some specific aspects of bad audio recordings, the problem of speaker variability is still a major challenge which is usually addressed by adding more domain specific data to the training pipeline, which, in turn, calls for better privacy safeguards.

Federated learning is a new paradigm that enables training of a central ASR model that does not require uploading users' local data to a central server, hence preserving users' privacy. In federated learning, the machine learning (ML) training process is moved towards on-premises local devices and only parameter updates are shared with the central server.

Work around decentralized learning for speech started with the training of independent and identically distributed (IID) partitions of a given dataset on multiple central processing units (CPUs) or multi-core machines. See, e.g., Daniel Povey, Xiaohui Zhang, and Sanjeev Khudanpur, "Parallel Training of Deep Neural Networks with Natural Gradient and Parameter Averaging", CoRR, vol. abs/1410.7455 (2014). That paper describes averaging the neural network (NN) parameters periodically and redistributing them to the different machines for further training using natural gradient, and each machine is trained on a different subset of data. However this approach does not allow for on-premises training, which is a key element to preserve privacy.

The main issue of on-premises training is the non-IID distributions between server and on-premises client-side data sources that negatively affect the quality of the trained ASR models. This problem is addressed by the Federated Averaging algorithm, described in H. B. McMahan, E. Moore, D. Ramage, S. Hampson, and B. A. y Arcas, "Communication-Efficient Learning of Deep Networks from Decentralized Data", Conference on Artificial Intelligence and Statistics (2017).

In the speech recognition domain, a recent application of the Federal Averaging algorithm with hyperparameter tuning and ad-hoc regularization has been demonstrated in a research setting, as described in Guliani, "Training Speech Recognition Models with Federated Learning: a Quality/Cost Framework" (2010.) However, this approach expects reliable labels on-premises, which is not available in a realistic production system.

Given the state of the art, the embodiments described herein provide a unique semi-supervised federated learning method suitable for a production level ASR system.

More specifically, described herein is a series of mechanisms that are configured to train a hybrid Deep Neural Network/Hidden Markov Model (DNN-HMM) ASR system in a decentralized way, using both labelled and unlabelled data (semi-supervised learning). The hybrid ASR system comprises an Acoustic Model (AM) and a Language Model (LM). In the following description, there is an assumption that a pre-trained generic ASR system has already been generated using labelled audio data. The AM is Neural Network (NN) based, while the LM could either be based on recurrent NN modeling or efficient N-Gram statistics.

Reference is now made to FIGS. 1-4, which show the interaction between on-premises inference module (IM) logic 130 and cloud based training module (TM) logic 150 in a semi-supervised federated learning approach for an ASR system, according to an example embodiment. As shown, IM logic 130 is hosted by a client 110 and TM logic 150 is hosted by a server 140. Client 110 and server 140 may be any one of a computer, laptop, tablet, or mobile device configured as described, e.g., in connection with FIG. 6. In an embodiment, server 140 is accessible via a cloud service.

Thus, the overall system, as shown, comprises two main components: IM logic 130 (on each client 110) and TM logic 150 (on server 140). IM logic 130 is a mixed inference/weight update module, and is configured to perform inference on local audio data using a given ASR system (i.e., model) and provide user specific updates to (TM) logic 150. TM logic 150 is configured to train a new ASR model based on the user specific updates.

Figure 2:
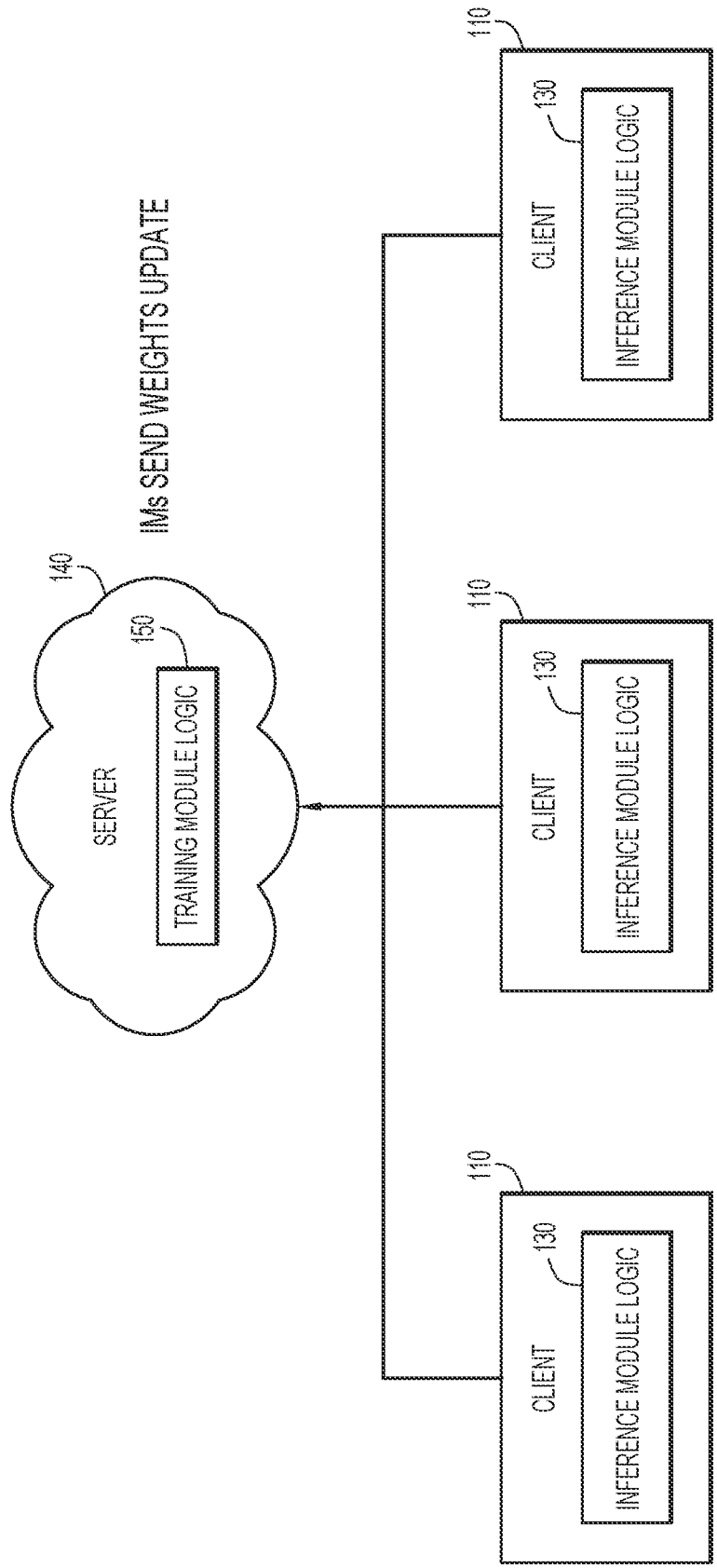

The general operation of IM logic 130 is as follows. IM logic 130 generates transcripts for live or recorded audio data that are employed by the AM forward pass that generates a set of phoneme lattices. These lattices are, in turn, used to generate the first-pass transcript of the speech audio data. Further, IM logic 130, using lattice supervision (as described by Manohar et al., "Semi-Supervised Training of Acoustic Models Using Lattice-Free MMI" (2018)), computes the sequence-level Lattice Free Mutual Maximum Information (LF-MMI) loss. This objective function provides a mechanism to incorporate uncertainties when dealing with unsupervised data hence allowing to compute the AM backward pass and provide local weights updates on-premises that can be further leveraged by (TM) logic 150. Contrary to the approach described in Guliani, "Training Speech Recognition Models with Federated Learning: a Quality/Cost Framework" (2010), where the predicted transcript is used to compute the gradient, Manohar et al. relies on lattices which allows more freedom. Once the local AM weights updates are computed, IM logic 130 shares the local AM weights with (TM) logic 150, along with an indication of the language spoken (e.g., English, French, etc.) in the audio data processed. FIG. 1 depicts (TM) logic 150 selecting clients 110 (and their respective instances of IM logic 130) to supply the local AM weights updates back to (TM) logic 150, and FIG. 2 shows each client 110 sending the local AM weights updates to (TM) logic 150.

Since only the local AM weights are shared with (TM) logic 150, no sensitive information is shared to the cloud, hence ensuring total privacy of user-specific data. In this regard, only a minimum amount of data is shared with (TM) logic 150 for updating the AM model. A significant aspect of IM logic 130 is that the local AM weights updates are obtained without the need of labelling or intervention from the user.

Figure 3:
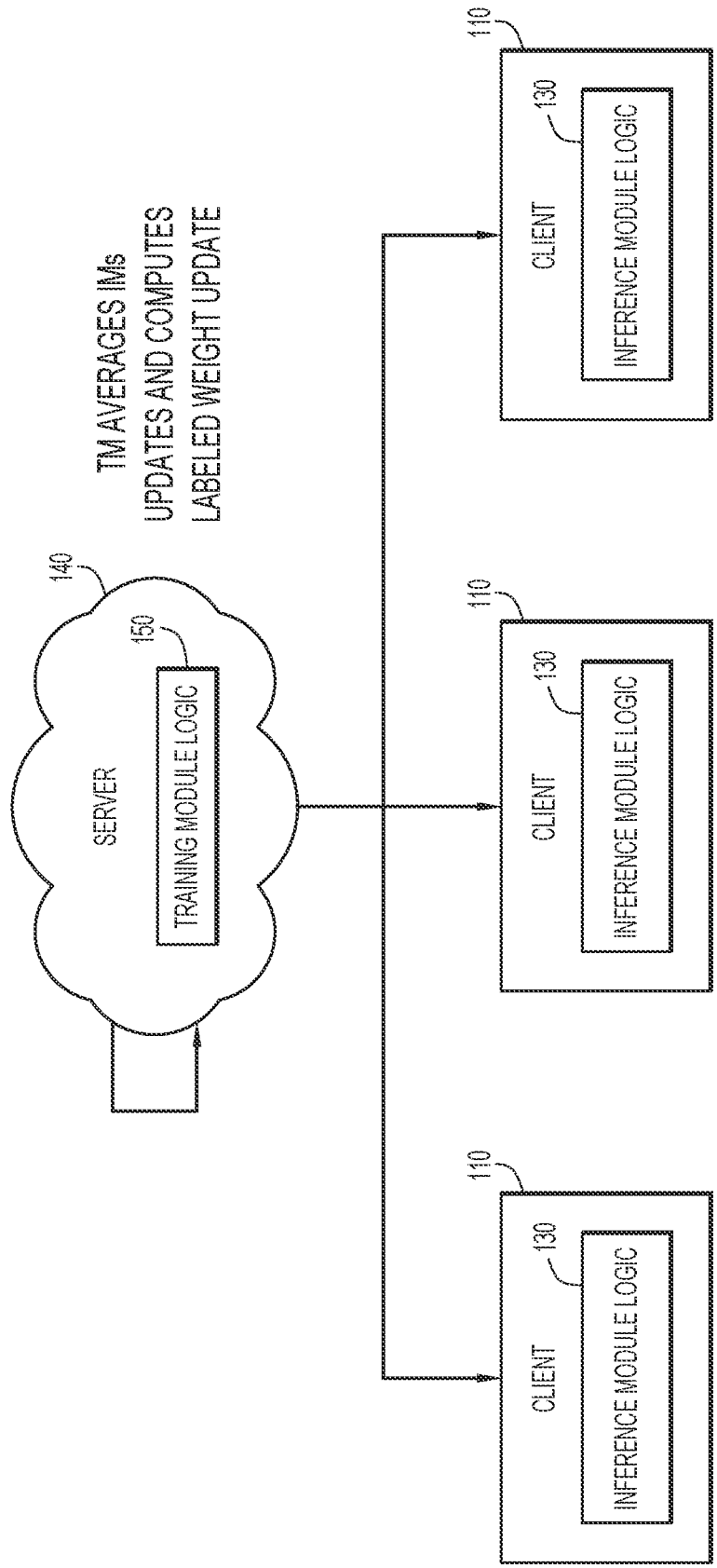
Figure 4:
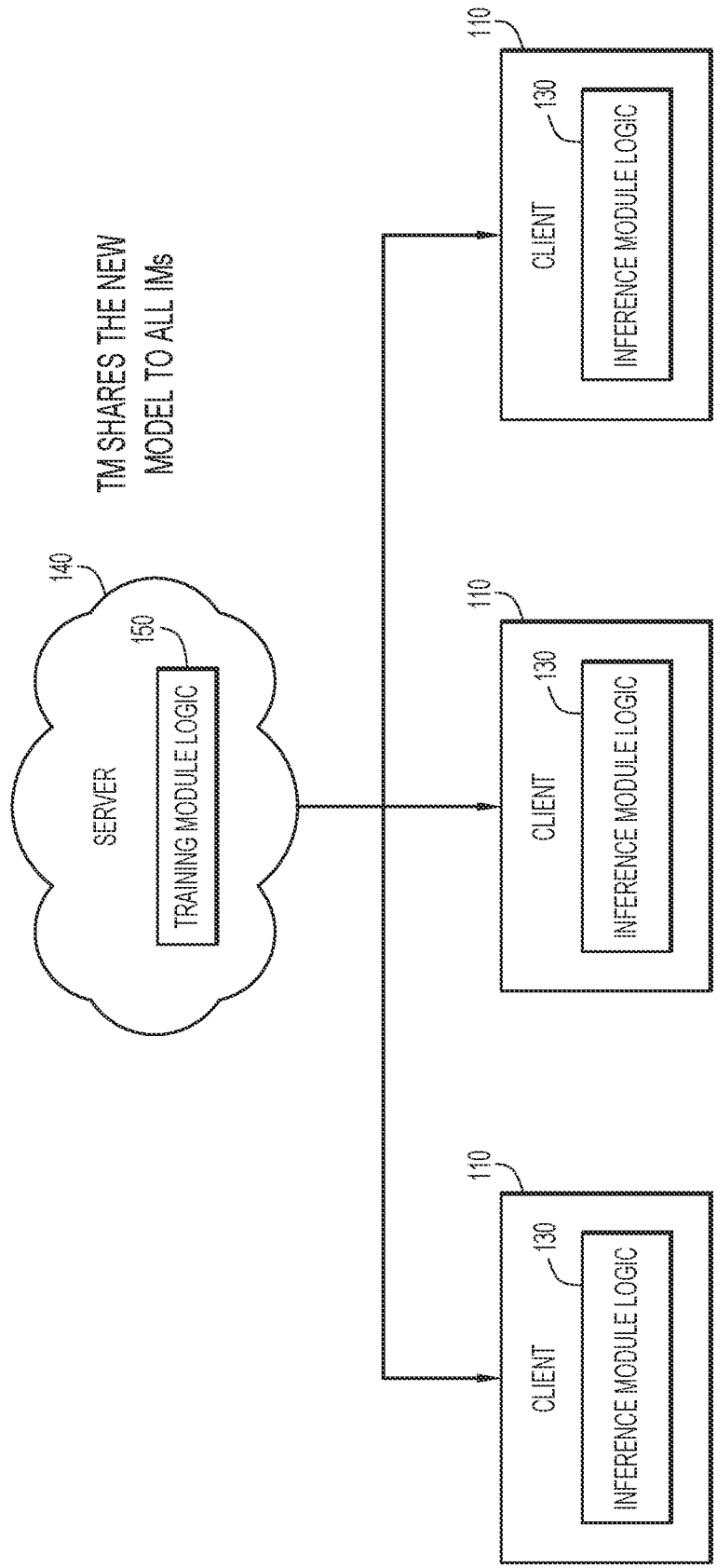

In FIG. 3, TM logic 150 trains a new ASR model. That is, TM logic 150, upon receiving a predetermined number of local AM weights updates from the respective instances of IM logic 130 running on the respective clients 110, triggers a global optimization process for the then-current ASR model. The global optimization process is based on Federated Averaging (FedAvg), but, importantly, does not require locally available labels. Once the global optimization process is complete, TM logic 150 shares the new (updated) ASR model with the respective instances of IM logic 130, as shown in FIG. 4.

The global optimization process, in accordance with an example embodiment, is referred to as "Semi Federated Averaging." In this process, TM logic 150 averages the local AM weights received from the respective clients 110. As noted, these local AM weights are computed without costly labelling of the audio data. Then, a random subset of labelled audio data separately available to (TM) logic 150 is selected and used to compute the weights updates. The final weights update is based on the weighted averages between the weights updates from labelled audio data (available to (TM) logic 150) and the average weights updates received from the individual instances of IM logic 130. A $\lambda$ parameter allows to scale up or down the unsupervised data. After NN convergence, the new refined AM NN is shipped to premise instances of IM logic 130.

The following is pseudo code for semi federated averaging in the semi-supervised federated learning approach for an ASR system, according to an example embodiment.

In the approach, K clients are indexed by k, rounds are indexed by r, $N_u$ is the number of unlabeled examples and $N_L$ the number of labeled example.

```
1: initialize w₀ from previous AM
2: for r = 1, 2, ... do
3:     K ← (random subset of M IMs)
4:     for each IM k ∈ K do
5:         ŵₖʳ ← ClientUpdate(k,wʳ)
6:         Δwₖʳ = wʳ − ŵₖʳ
7:     end for
```

$$\overline{w}_U^r = \sum_{k=1}^{K} \frac{n_k}{N_U} \Delta w_k^r$$

```
9:     n_L ← (random subset of N_L labelled samples)
10:    w̄_Lʳ ← ServerUpdate(n_L, wʳ)
11:    w̄ʳ = λw̄_Lʳ + (1 − λ)w̄_Uʳ    ▷ λ ∈ [0, 1]
12:    wʳ⁺¹ = wʳ − ηw̄ʳ
13: end for
```

Each line of code is described below in turn.

1. An acoustic model (AM) can be modeled as a set of matrices. Semi federated averaging starts with a pre-existing AM model. The set of matrices is denoted wo and correspond to the weights.

2. In an outer "do" loop, the process is executed for several rounds with each round denoted as r. A first round, is, e.g., for r=0.

3. TM logic 150 selects M clients 110 (IMs). An example would be, for r=0, TM logic 150 selects ten clients (IMs) from all the available clients 110 (IMs).

4. An inner "do" loop is then executed for each of the IMs (independently).

5. Retrieve weights from given IM, and assign it to w "hat".

6. Calculate the difference between the current weights ($w_0$) and the weights retrieved from the IM. Since ten clients were selected in the instant example, ten values, one difference per IM, are obtained.

7. The inner "do" loop is closed.

8. Calculate the weighted average of the differences. That is, if IM-1 sent a weights update based on more data than IM-2, the weights update from IM-1 should be more represented. For example, if there were only two IMs, and IM-1 sent its weights update after processing 60 minutes of audio, while IM-2 sent its weights update after processing 20 minutes of audio; then $n_1$=60, $n_2$=20 and $N_U$=80 (60+20). This average corresponds to the weights update from unlabelled audio.

9. Select random number of labelled examples from cloud labelled audio data (i.e., labelled data available separately to (TM) logic 150), and assign it to $N_L$.

10. Generate weights update using the $N_L$ labelled samples. This weights update corresponds to the weights update from labelled audio data in the cloud.

11. Calculate the weights update used to update the Acoustic Model. This weights update is a linear combination between the weight updates from unlabelled data (line 8) and from the labelled one (line 10). Lambda (λ) is a parameter to control how much "power" is given to unlabelled data versus labelled data. For example, if it is known that the unlabelled data is of poor quality (noisy data, etc.), a large λ is selected to give more weight to the labelled data, and less weight to the unlabelled data.

12. The round ends by updating the weights from the AM with the update calculated at line 11. The new weights are re-used in the next round (r=1).

13. The outer "do" loop is closed.

As will be appreciated by those skilled in the art, the operations represented by lines 4-7 of the above pseudocode are performed by IM logic 130 at each client 110, while the operations represented by lines 1-3 and 8-13 are performed by (TM) logic 150 at server 140.

The table below shows the results of two experiments, in which an AM NN was trained with labelled and unlabelled data (Exp 1 and Exp 2, respectively) in the cloud.

|  | Exp 1 | Exp 2 |
| --- | --- | --- |
| WER - Offline | 22.32 | 21.03 |
| WER - Online | 24.29 | 22.54 |

In Exp 1 the AM was trained with approximately 4600 hours of augmented labelled audio data.

In Exp 2 the AM was trained with approximately 4600 hours of augmented labelled audio and 5000 hours of unlabelled data. "WER" stands for Word-Error-Rate.

As indicated, two acoustic models were analyzed, one model for offline inference and one model for online prediction. Adding 5000 hours of unlabelled data (of the kind that would be generated by IM logic 130), improves the offline model by 1.3% absolute WER and by 1.75% absolute WER for the online model.

Those skilled in the art will appreciate that the embodiments described herein re-use on premise computation for weights updates, thus reducing the energy footprint of training a deep neural network, ensure privacy as no personal data from user device is shared to the cloud, are configured to access a large amount of unlabelled data, and are cost efficient as no human labelling is needed.

Figure 5:
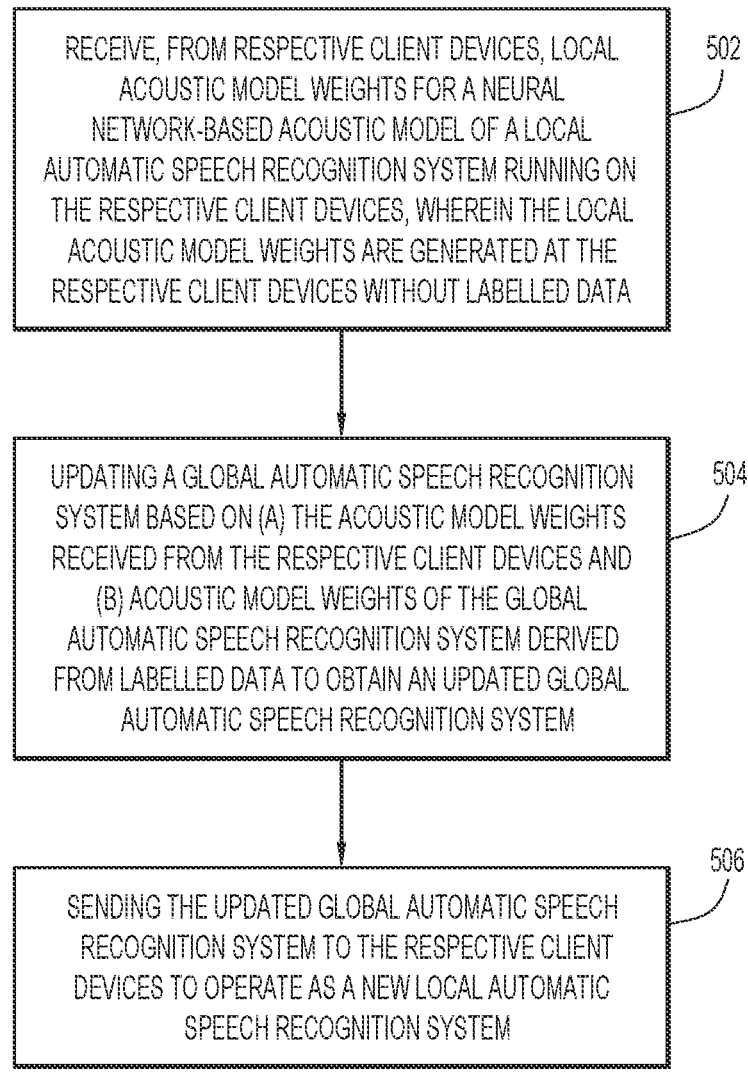
FIG. 5 is a flowchart showing a series of operations for executing the semi-supervised federated learning approach for the ASR system, according to an example embodiment.

FIG. 5 is a flowchart showing a series of operations for executing the semi-supervised federated learning approach for an ASR system, according to an example embodiment. The following operations may be performed by, e.g., inference module logic 130 and training module logic 150. At 502, an operation receives, from respective client devices, local acoustic model weights for a neural network-based acoustic model of a local automatic speech recognition system running on the respective client devices, wherein the local acoustic model weights are generated at the respective client devices without labelled data. At 504, an operation updates a global automatic speech recognition system based on (a) the acoustic model weights received from the respective client devices and (b) global acoustic model weights of the global automatic speech recognition system derived from labelled data to obtain an updated global automatic speech recognition system. And, at 506, an operation sends the updated global automatic speech recognition system to the respective client devices to operate as a new local automatic speech recognition system.

Figure 6:
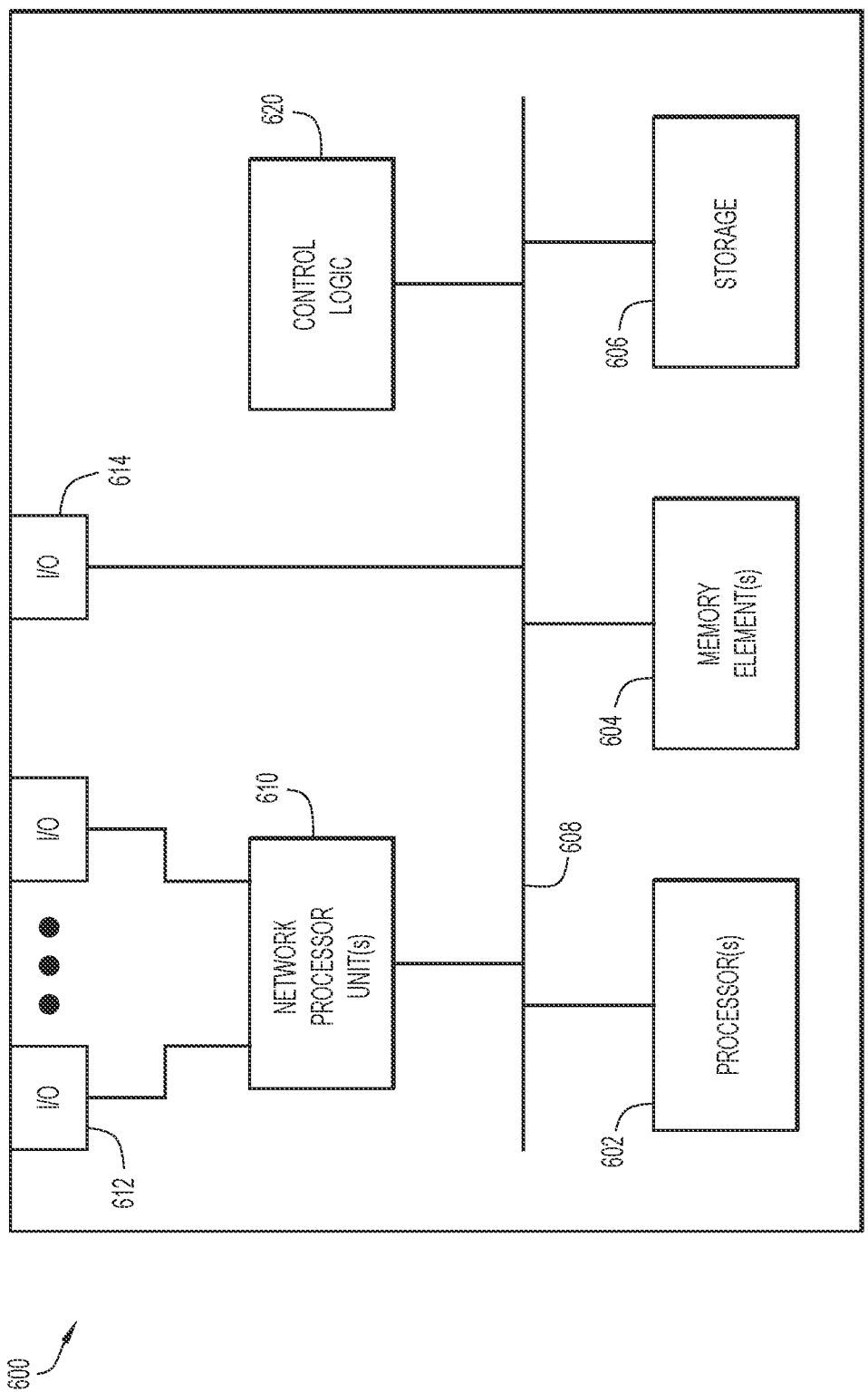
FIG. 6 illustrates a hardware block diagram of a computing device that may be configured to execute training module logic or inference module logic, according to an example embodiment.

FIG. 6 illustrates a hardware block diagram of a computing device that may be configured to execute IM logic 130 and/or (TM) logic 150, according to an example embodiment.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., inference module logic 130, training module logic 150) can, in various embodiments, be stored for computing device 600 using any combination of memory element(s) 604 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof, and/or the like to facilitate various operations for embodiments described herein.

The programs described herein (e.g., inference module logic 130, training module logic 150) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11

(e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

Inسum, a method is provided. The method may include receiving, from respective client devices, at a cloud server, local acoustic model weights for a neural network-based acoustic model of a local automatic speech recognition system running on the respective client devices, wherein the local acoustic model weights are generated at the respective client devices without labelled data, updating a global automatic speech recognition system based on (a) the local acoustic model weights received from the respective client devices and (b) global acoustic model weights of the global automatic speech recognition system derived from labelled data to obtain an updated global automatic speech recognition system, and sending the updated global automatic speech recognition system to the respective client devices to operate as a new local automatic speech recognition system.

The method may further include selecting the respective client devices from which to receive the local acoustic model weights.

In an embodiment, the global automatic speech recognition system may be a hybrid Deep Neural Network/Hidden Markov Model (DNN-HMM) automatic speech recognition system.

The method may further include executing a language model that is based on one of recurrent neural network modeling or efficient N-Gram statistics.

The method may further include receiving from the respective client devices an indication of a language processed by the respective client devices.

In an embodiment, updating the global automatic speech recognition system includes calculating differences between global acoustic model weights of the global automatic speech recognition system and respective local acoustic model weights received from the respective client devices.

In an embodiment, updating the global automatic speech recognition system may further include calculating a weighted average of the differences.

In an embodiment, updating the global automatic speech recognition system may still further include calculating a weights update for the global automatic speech recognition system based on the weighted average of the differences and the global acoustic model weights of the global automatic speech recognition system derived from labelled data.

In an embodiment, updating the global automatic speech recognition system may also include controlling a balance of influence between the weighted average of the differences and the global acoustic model weights of the global automatic speech recognition system derived from labelled data.

In one implementation, the local acoustic model weights are derived without intervention from a user.

In another embodiment a device is provided. The device may include an interface configured to enable network communications, a memory, and one or more processors coupled to the interface unit and the memory, and configured to: receive, from respective client devices, local acoustic model weights for a neural network-based acoustic model of a local automatic speech recognition system running on the respective client devices, wherein the local acoustic model weights are generated at the respective client devices without labelled data, update a global automatic speech recognition system based on (a) the local acoustic model weights received from the respective client devices and (b) global acoustic model weights of the global automatic speech recognition system derived from labelled data to obtain an updated global automatic speech recognition system, and send the updated global automatic speech recognition system to the respective client devices to operate as a new local automatic speech recognition system.

The one or more processors may be configured to select the respective client devices from which to receive the local acoustic model weights.

In an embodiment, the global automatic speech recognition system may be a hybrid Deep Neural Network/Hidden Markov Model (DNN-HMM) automatic speech recognition system.

The one or more processors may be configured to support a language model that is based on one of recurrent neural network modeling or efficient N-Gram statistics.

The one or more processors may be configured to receive from the respective client devices an indication of a language processed by the respective client devices.

The one or more processors may be configured to update the global automatic speech recognition system by calculating differences between global acoustic model weights of the global automatic speech recognition system and respective local acoustic model weights received from the respective client devices.

The one or more processors may be configured to update the global automatic speech recognition system further by calculating a weighted average of the differences.

The one or more processors are configured to update the global automatic speech recognition model by calculating a weights update for the global automatic speech recognition system based on the weighted average of the differences and the global acoustic model weights of the global automatic speech recognition system derived from labelled data.

In yet another embodiment, a non-transitory computer readable storage media encoded with instructions is provided. The instructions, when executed by a processor, cause the processor to: receive, from respective client devices, local acoustic model weights for a neural network-based acoustic model of a local automatic speech recognition system running on the respective client devices, wherein the local acoustic model weights are generated at the respective client devices without labelled data, update a global automatic speech recognition system based on (a) the local acoustic model weights received from the respective client devices and (b) global acoustic model weights of the global automatic speech recognition system derived from labelled data to obtain an updated global automatic speech recognition system, and send the updated global automatic speech recognition system to the respective client devices to operate as a new local automatic speech recognition system.

In one implementation, the global automatic speech recognition system is a hybrid Deep Neural Network/Hidden Markov Model (DNN-HMM) automatic speech recognition system.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
receiving, from respective client devices, at a cloud server, local acoustic model weights for a neural network-based acoustic model of a local automatic speech recognition system running on the respective client devices, wherein the local acoustic model weights are generated at the respective client devices without labelled data;
updating a global automatic speech recognition system based on (a) the local acoustic model weights received from the respective client devices and (b) global acoustic model weights of the global automatic speech recognition system derived from labelled data to obtain an updated global automatic speech recognition system, wherein the updating comprises controlling an influence of unsupervised data on the updated global automatic speech recognition system by multiplying a first balancing coefficient with the local acoustic model weights and multiplying a second balancing coefficient with the global acoustic model weights, and combining resulting multiplication products thereof, wherein the first balancing coefficient is equal to one minus the second balancing coefficient, and wherein the second balancing coefficient has a value of zero to one; and sending the updated global automatic speech recognition system to the respective client devices to operate as a new local automatic speech recognition system.

2. The method of claim 1, further comprising selecting the respective client devices from which to receive the local acoustic model weights.

3. The method of claim 1, wherein the global automatic speech recognition system is a hybrid Deep Neural Network/Hidden Markov Model (DNN-HMM) automatic speech recognition system.

4. The method of claim 1, further comprising executing a language model that is based on one of recurrent neural network modeling or efficient N-Gram statistics.

5. The method of claim 1, further comprising receiving from the respective client devices an indication of a language processed by the respective client devices.

6. The method of claim 1, wherein updating the global automatic speech recognition system comprises calculating differences between global acoustic model weights of the global automatic speech recognition system and respective local acoustic model weights received from the respective client devices.

7. The method of claim 6, wherein updating the global automatic speech recognition system further comprises calculating a weighted average of the differences.

8. The method of claim 7, wherein updating the global automatic speech recognition system further comprises calculating a weights update for the global automatic speech recognition system based on the weighted average of the differences and the global acoustic model weights of the global automatic speech recognition system derived from labelled data.

9. The method of claim 8, wherein updating the global automatic speech recognition system further comprises controlling a balance of influence between the weighted average of the differences and the global acoustic model weights of the global automatic speech recognition system derived from labelled data.

10. The method of claim 1, wherein the local acoustic model weights are derived without intervention from a user.

11. A device comprising:
a network interface;
a memory; and
one or more processors coupled to the network interface and the memory, and configured to:
receive, from respective client devices, local acoustic model weights for a neural network-based acoustic model of a local automatic speech recognition system running on the respective client devices, wherein the local acoustic model weights are generated at the respective client devices without labelled data;
update a global automatic speech recognition system based on (a) the local acoustic model weights received from the respective client devices and (b) global acoustic model weights of the global automatic speech recognition system derived from labelled data to obtain an updated global automatic speech recognition system, including controlling an influence of unsupervised data on the updated global automatic speech recognition system by multiplying a first balancing coefficient with the local acoustic model weights and multiplying a second balancing coefficient with the global acoustic model weights, and combining resulting multiplication products thereof, wherein the first balancing coefficient is equal to one minus the second balancing coefficient, and wherein the second balancing coefficient has a value of zero to one; and
send the updated global automatic speech recognition system to the respective client devices to operate as a new local automatic speech recognition system.

12. The device of claim 11, wherein the one or more processors are configured to select the respective client devices from which to receive the local acoustic model weights.

13. The device of claim 11, wherein the global automatic speech recognition system is a hybrid Deep Neural Network/Hidden Markov Model (DNN-HMM) automatic speech recognition system.

14. The device of claim 11, further comprising a language model that is based on one of recurrent neural network modeling or efficient N-Gram statistics.

15. The device of claim 11, wherein the one or more processors are configured to receive from the respective client devices an indication of a language processed by the respective client devices.

16. The device of claim 11, wherein the one or more processors are configured to update the global automatic speech recognition system by calculating differences between global acoustic model weights of the global automatic speech recognition system and respective local acoustic model weights received from the respective client devices.

17. The device of claim 16, wherein the one or more processors are further configured to update the global automatic speech recognition system by calculating a weighted average of the differences.

18. The device of claim 17, wherein the one or more processors are configured to update the global automatic speech recognition system by calculating a weights update for the global automatic speech recognition system based on the weighted average of the differences and the global acoustic model weights of the global automatic speech recognition system derived from labelled data.

19. A non-transitory computer readable storage media encoded with instructions that, when executed by a processor, cause the processor to:
receive, from respective client devices, local acoustic model weights for a neural network-based acoustic model of a local automatic speech recognition system running on the respective client devices, wherein the local acoustic model weights are generated at the respective client devices without labelled data;
update a global automatic speech recognition system based on (a) the local acoustic model weights received from the respective client devices and (b) global acoustic model weights of the global automatic speech recognition system derived from labelled data to obtain an updated global automatic speech recognition system, including controlling an influence of unsupervised data on the updated global automatic speech recognition system by multiplying a first balancing coefficient with the local acoustic model weights and multiplying a second balancing coefficient with the global acoustic model weights, and combining resulting multiplication products thereof, wherein the first balancing coefficient is equal to one minus the second balancing coefficient, and wherein the second balancing coefficient has a value of zero to one; and
send the updated global automatic speech recognition system to the respective client devices to operate as a new local automatic speech recognition system.

20. The non-transitory computer readable storage media of claim 19, wherein the global automatic speech recognition system is a hybrid Deep Neural Network/Hidden Markov Model (DNN-HMM) automatic speech recognition system.

\* \* \* \* \*